United States Patent [19]
Vandenburg

[11] 3,911,989
[45] Oct. 14, 1975

[54] TIRE CHANGER
[76] Inventor: William Vandenburg, Lark, N. Dak. 58550
[22] Filed: July 24, 1974
[21] Appl. No.: 491,466

[52] U.S. Cl. ............................................... 157/1.24
[51] Int. Cl.² .......................................... B60C 25/06
[58] Field of Search ......... 157/1.1, 1.17, 1.22, 1.24, 157/1.28

[56] References Cited
UNITED STATES PATENTS

| | | | |
|---|---|---|---|
| 2,569,789 | 10/1951 | Weaver | 157/1.24 |
| 2,609,039 | 9/1952 | Henderson | 157/1.24 |
| 3,528,475 | 9/1970 | Duquesne | 157/1.24 |

Primary Examiner—Al Lawrence Smith
Assistant Examiner—Harold P. Smith, Jr.
Attorney, Agent, or Firm—James W. Pearce; Roy F. Schaeperklaus

[57] ABSTRACT

This device is a manually operated tire changer using crank and sprocket means so as to increase the leverage in mounting and removing tires from rims. The device includes primarily a base frame which has vertically supported within bearings, a pipe member to which is mounted a turned-table plate and a vertical crank is mounted within bearing means and carries sprocket means for an endless chain which is carried upon the sprocket secured to the pipe of the device.

2 Claims, 3 Drawing Figures

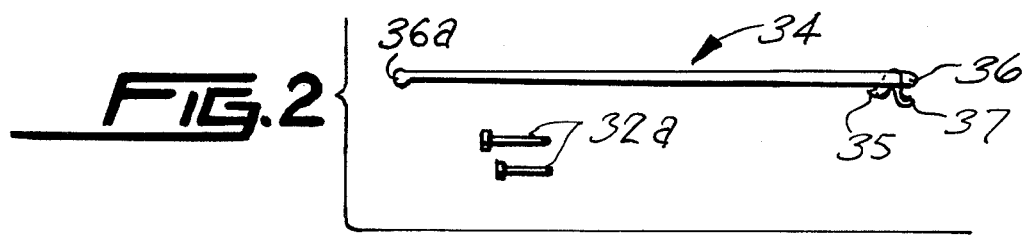
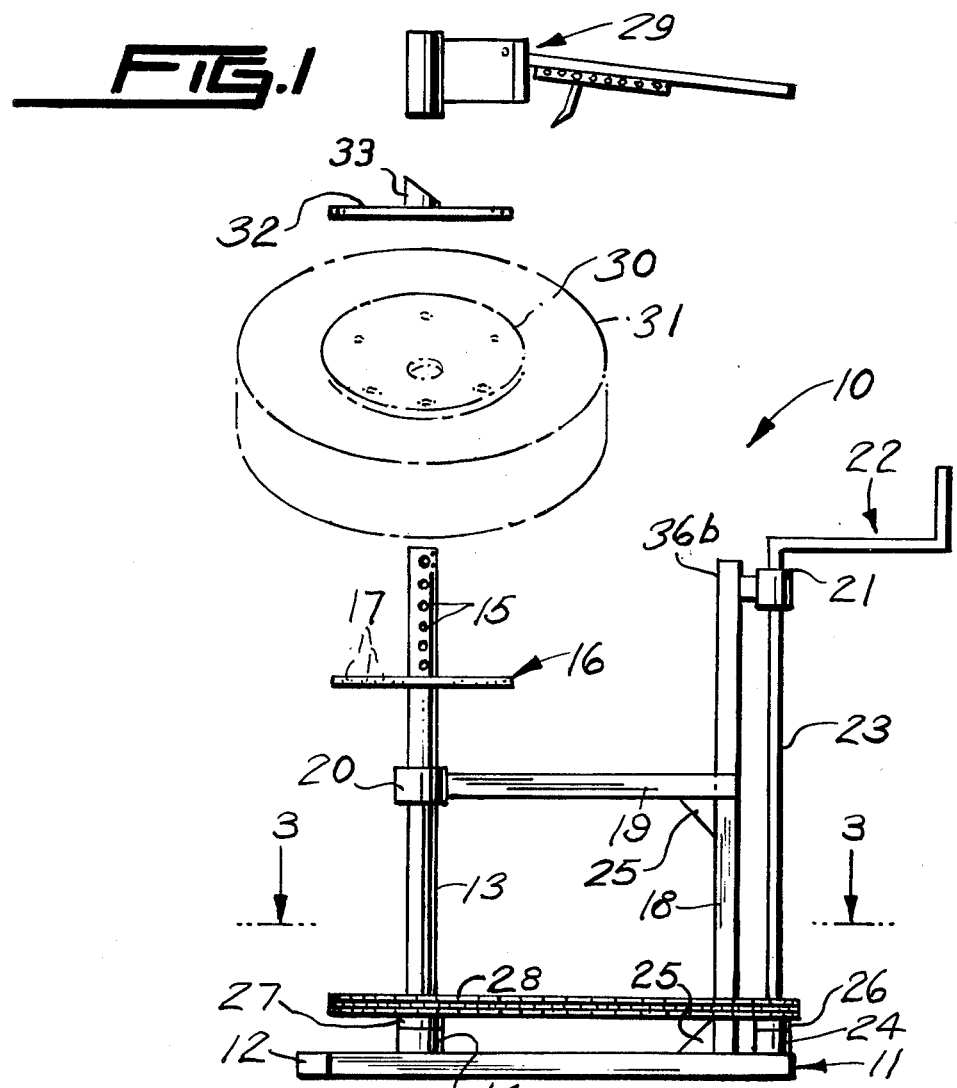
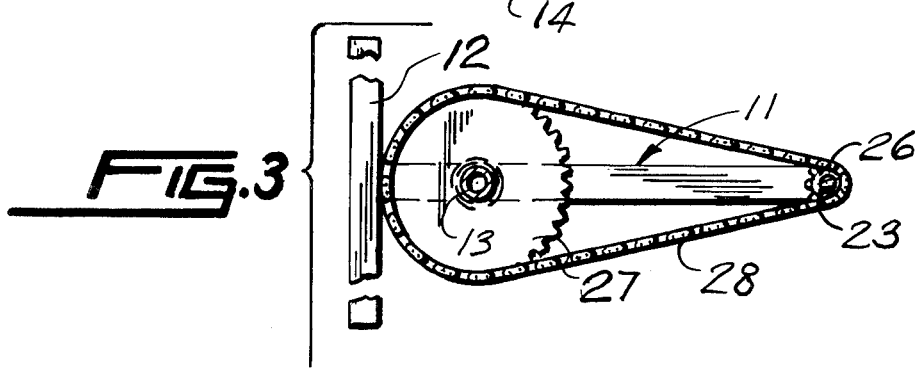

TIRE CHANGER

This invention relates to vehicles' tires, and more particularly to a tire changer.

It is therefore the principal object of this invention to provide a tire changer which will be manually operated and will include chain and sprocket means so as to increase the mechanical advantage when mounting and removing tires from the rims of cars.

Another object of this invention is to provide a tire changer which will have bearing means mounted to the base frame for supporting the pipe and turn table and also the crank rod which is to be manually operated.

Other objects of this invention are to provide a tire changer which is simple in design, inexpensive to manufacture, rugged in construction, easy to use and efficient in operation.

These and other objects will be readily evident upon a study of the following specification and the accompanying drawing, wherein:

FIG. 1 is a partially exploded side view of the present invention, showing the tire and rim in phantom lines;

FIG. 2 is a plan view of the mounting and removing tool and clevis pin of the device;

FIG. 3 is a cross-sectional view taken along the line 3—3 of FIG. 1.

According to this invention, tire changer 10 includes a base member 11 having secured to it a cross bar stabilizer member 12. A pipe 13 is supported vertically within a bearing 14 which is fixedly secured to base 11 and the upper extermity of pipe 13 is provided with a plurality of spaced apart openings 15, above turn table plate 16 which includes radially spaced apart openings 17 which are spaced from the near circumferial edge, to near the center so as to lock, by pin means the rim in position when accommodating various sized rims.

A vertical bar 18 is secured fixedly at one end to base 11 and has fixedly secured thereto, at one end, a cross bar member 19 and is secured at its opposite end, bearing 20 within which pipe 13 rotates. A bearing 21 is secured fixedly to the upper extreme portion of bar 18 and provides support means for the rotatable crank 22 having its elongated crank rod portion 23 rotatably supported within bearing 24 which is fixedly secured to base 11. A pair of gussets 25, are one each, secured fixedly to base 11 and bar 18 and bar 19 is secured fixedly to the upper gussets 25 thus imparting maximum rigidity for the frame consisting of the base 11 and the other components heretofore described. A sprocket 26 is fixedly secured to crank rod 23 in a suitable manner and sprocket 26 carries an endless chain 28 which is also carried upon sprocket 27 secured fixedly to pipe 13. Crank 22 provides rotation means for pipe 13 through the sprockets 26, 27 and chain 28.

Tire changer device 10 also includes a bead breaking member 29 for breaking the bead fully of tire 31. Tire changer 10 includes a tire rim hold-down device 32 having a beveled sleeve portion 33. The mounting and removing tool 34 includes a lip 35 which is for the purpose of hooking under the edge of the rim so as to enable the end 36 to force the tire 31 down over the edge of the rim and the lip 37 hooks under the tire bead 30 so as to keep lip 35 forced back under the edge of the rim.

In operation, tire 31 with its rim is placed upon the turn table 16. The tire rim hold-down device 32 is placed over pipe 13 and down to the tire 31 a clevis pin 32a is placed in one of the openings 15 of pipe 13 so as to lock the hold-down device 32 in place. Bead breaker 29 is placed over pipe 13, down to the hold-down device 32. Pin 32a is placed through one of the openings 15 of pipe 13 above the bead braker 29. After the bead 30 is broken on one side, tire 31 is turned over and the same above mentioned procedure is used.

In order to remove tire 31 from its rim, tool 34 is used. End 36a of tool 34 is placed under the bead 30 of tire 31, (bead breaker 29 is removed for this operation). Tool 34 is laid across tire 31 in a horizontal position with end 36a under the bead 30 and tool 34 is braced against pipe 13 and also against the portion of the tire changer frame at 36b. Crank 22 is rotated, thus rotating the small sprocket 26 and the large sprocket 27 through the use of chain 28. The aforementioned will rotate pipe 13 and tire 31 with tool 34, forcing bead 30 of tire 31 upwards over the rim.

Tire 31 is mounted in the same manner using the end of tool 34.

What I now claim is:

1. A tire changer which comprises a base member, a crank having an upright axis rotatably mounted on the base member, a pipe member rotatably mounted on the base member spaced from and parallel to the axis of the crank, bearing means carried by said base member and rotatably supporting the crank and the pipe member, sprocket means carried by the crank and by the pipe member, chain means running on the sprocket means so that turning of the crank means turns the pipe member, a turn table plate mounted on the pipe member for supporting a wheel and a tire mounted on the wheel to turn therewith, a bead breaking member removably mountable on the pipe member overlying the turn table plate and engageable with the tire to break a bead of the tire from a rim of the wheel, a tire hold-down member removably mountable on the pipe member to hold the wheel on the turn table plate, and a mounting and removing tool engageable with the bead of the tire as the crank is turned to turn the pipe member and the wheel to advance the bead over the rim of the wheel.

2. A tire changer which comprises a base member, a stabilizer cross bar carried by the base member, a crank having an upright axis rotatably mounted on the base member, a pipe member rotatably mounted on the base member spaced from and parallel to the crank, an upright bar mounted on the base member, bearing means carried by said base member and rotatably supporting the crank and the pipe member, bearing means carried by said upright bar spaced above the base member and rotatably supporting the crank and the pipe member, small diameter sprocket means carried by the crank, large diameter sprocket means carried by the pipe member, chain means running on the sprocket means so that turning of the crank means turns the pipe member, a turn table plate mounted on the pipe member for supporting a wheel and tire combination to turn therewith, a bead breaking member removably mountable on the pipe member overlying the turn table plate and engageable with a bead of the tire to break the bead from a rim of the wheel, a wheel hold-down member removably mountable on the pipe member to hold the wheel on the turn table plate, there being spaced apart openings in the pipe member overlying the turn table plate for receiving pin means to hold the tire hold-down member on the pipe member, and a mounting and removing tool having lip means secured fixedly to an end portion thereof and engageable with the bead of the tire as the crank is turned to turn the pipe member and the wheel to advance the bead over the rim of the wheel.

* * * * *